May 27, 1969     R. S. GOODRICH     3,445,898

HEAT SHRINKABLE CABLE CLAMP

Filed Oct. 19, 1967

INVENTOR.
ROGER S. GOODRICH
BY
*Lyon & Lyon*
ATTORNEYS

United States Patent Office 3,445,898
Patented May 27, 1969

3,445,898
HEAT SHRINKABLE CABLE CLAMP
Roger S. Goodrich, Fulton County, Ga., assignor to Raychem Corporation, Menlo Park, Calif., a corporation of California
Filed Oct. 19, 1967, Ser. No. 676,414
Int. Cl. F16l 3/12
U.S. Cl. 24—16   10 Claims

ABSTRACT OF THE DISCLOSURE

A clamp for use with cable, wire bundles, or the like of differing sizes and having a heat recoverable portion for engaging the object to be supported and a rigid, non-recoverable portion for connection to a wall or other surface.

---

Many clamping devices have in the past been provided for attaching cables, bundles of wires, or the like, to a wall, bulkhead or other surface. These clamps are generally of a fixed size and thus are suitable for use with only a particular size object. While such clamps are quite suitable in use, the great diversity in the size of the cables or other objects with which they are to be used requires that an extensive inventory of different size clamps be maintained. This is both expensive and annoying to the workmen who must find the right size clamp for a particular cable or other object.

It is an object of the present invention to provide a clamp for supporting cables, wire bundles, and the like of different diameters or dimensions.

It is another object of the present invention to provide such a clamp which is electrically insulated.

According to the present invention, a clamp is provided which has a first portion constructed of a heat recoverable material and a second portion constructed of a rigid, preferably non-recoverable portion. The heat recoverable portion is used to enclose the cable, wire bundle, or the like to be supported while the rigid portion of the clamp is used to attach the clamp to the desired surface. After the object to be supported has been inserted within the heat recoverable portion of the clamp, the clamp can be attached to the surface and the heat recoverable portion thereof then heated to cause it to shrink down around the object to hold it in place. Depending on the amount of heat recoverability built into the heat recoverable portion, a single clamp can be used with a wide variety of object sizes.

Preferably, the heat recoverable portion of the clamp of the present invention comprises an independently dimensionally heat unstable loop. In general, such a loop may be made of a material having the property of plastic or elastic memory which is heated to above its crystalline melting temperature and expanded longitudinally and then cooled while maintained in its expanded position. A member treated in this manner will retain its expanded position until it is again heated to its crystalline melting temperature at which time it will recover to its original shape, that is, its original length. Examples of such heat recoverable materials may be found in Currie U.S. Patent No. 2,027,962 and Cook et al. U.S. Patent No. 3,086,242 the disclosures of which are incorporated herein by reference. Polymeric materials which have been cross-linked by chemical means or by irradiation, for example, with high energy electrons or nuclear irradiation, such as those disclosed in the Cook et al. patent, are preferred for use in the present invention. Non-crystalline polymeric materials exhibiting the property of plastic or elastic memory, such as polyurethane, ionomers, etc., could also be used in the present invention. Since materials possessing either plastic memory or elastic memory are equally useful in the present invention, these terms are used interchangeably and are meant to be mutually inclusive. The various objects and advantages of the present invention will become apparent upon reference to the accompanying description and drawings in which:

Figure 1:
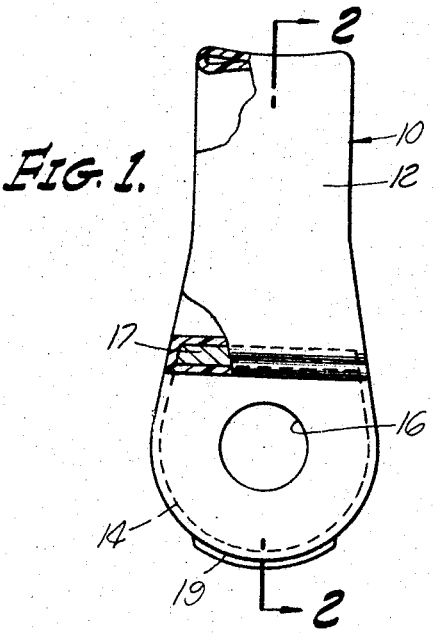
FIGURE 1 is a side view, partly in section, of the clamp of the present invention.

As shown in these several features, the clamp of the present invention comprises an elongated piece of plastic tubing 10 having a portion thereof formed into a loop 12 and having reinforcing inserts 13 and 14 positioned in each end thereof, these inserts being, for example, of metal or plastic and being provided with apertures 15 and 16 respectively. The insert 13 is flat and has a generally pear shape while the insert 14 is provided with a bent portion 17 so that it is generally L-shaped. It should be understood, of course, that these inserts can be of any desired size or shape.

In order to facilitate the insertion of the inserts 13 and 14, the tubing 10 is first preferably extruded and expanded in any desired fashion, for example, as taught by the aforementioned Cook et al. patent. Preferably, the tubing is expanded in the diametric direction only enough to permit the inserts 13 and 14 to be inserted into its ends. The inserts 13 and 14 are then inserted into the ends of the tubing and the ends of the tubing adjacent these inserts then heated to above the heat recovery temperature of the tubing material so that it recovers down around the inserts and firmly engages them. If desired, the ends of the tubing can be crimped as shown at 18 and 19 to still further entrap the inserts. If desired, additional crimping or an adhesive can also be utilized to make an even stronger attachment between the inserts and the tubing.

Figure 2:
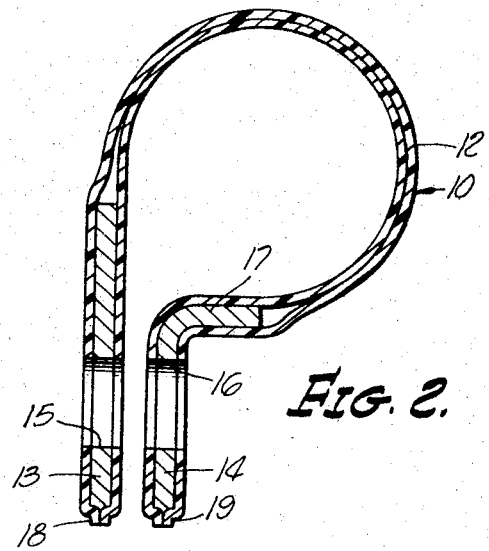
FIGURE 2 is a cross-sectional view taken along lines 2—2 of FIGURE 1.

The loop portion 12 of the clamp is now formed by heating the appropriate portion of the tubing to above its heat recovery temperature and then stretching it around a suitable mandrel so that the tubing is expanded longitudinally. This expansion, of course, results in the flattening of the tube as shown in FIGURES 1 and 2. The tubing is held in place around the mandrel while it is cooled so that the loop 12 is frozen in its expanded shape. Holes can now be punched in the ends of the tubing corresponding to the apertures 15 and 16 of the inserts 13 and 14. Of course, this could be done prior to the longitudinal expansion if desired. It should be understood that this method of making the clamp is only exemplary and should not be considered as restrictive.

Figure 3:
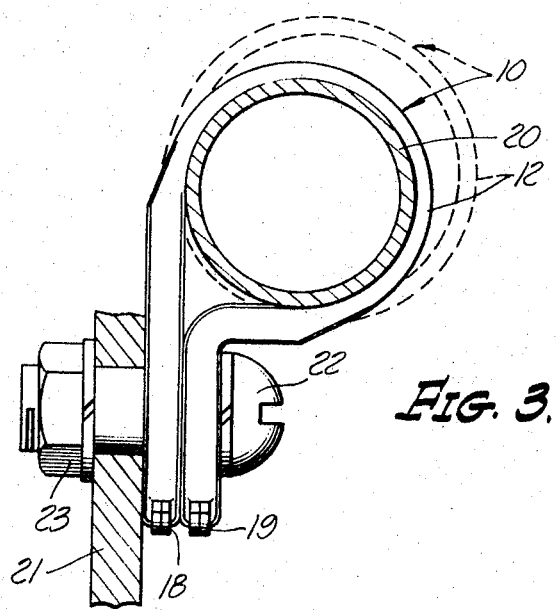
FIGURE 3 is an end view showing the clamp of the present invention fastened to a wall and recovered about a cable.

The clamp is now ready for use. As shown in phantom in FIGURE 3, the loop 12 is originally larger than the diameter of the cable 20 with which the clamp is to be used. In the normal installation, the loop 12 is positioned around the cable 20 and the ends of the tubing containing the inserts 13 and 14 then positioned adjacent a wall or other surface 21 and bolted thereto by means of a bolt 22 and a nut 23. As shown, the ends of the tubing containing the inserts 13 and 14 are positioned on the same side of the wall 21; they could, of course, be positioned on opposite sides if each was required or desired. Heat is now applied to the loop portion 12 of the tubular member 10 sufficient to cause it to be heated to above its recovery temperature. As a result, the loop recovers until its tightly engages the cable 20 and forces it into firm engagement with the portions of the tubing containing the inserts 13 and 14. As can be seen the size of the cable 20 is immaterial so long as it is greater than the original size of the tubing before it was longitudinally expanded. If desired, the ends of the clamp temporarily could be fastened together and the loop then recovered around the cable and cooled. The ends of the clamp could then be fastened by suitable means to a suitable surface.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A clamping device comprising a member having first and second end portions and a loop portion intermediate said end portions, said loop portion being longitudinally heat recoverable whereby the diameter of said loop can be reduced, and means for permitting attachment of said end portions to each other and to an adjacent surface.

2. The clamping device of claim 1 where said means comprise reinforcing inserts positioned within said end portions.

3. The clamping device of claim 2 wherein said end portions are heat recovered around said inserts.

4. The clamping device of claim 3 wherein said inserts and said end portions are provided with apertures for receiving fastening means.

5. A clamping device comprising a member having first and second end portions and an intermediate portion, said intermediate portion comprising material which has been elongated from an original heat stable form to an independently heat unstable form capable of shrinking in the longitudinal direction upon the application of heat alone, first means for reinforcing said first end region, second means for reinforcing said second end region, said first and second means being provided with means to permit attachment one to the other.

6. A clamping device comprising a tubing having first and second end portions and an intermediate portion, said intermediate portion comprising material which has been elongated from an original heat stable form to an independently heat unstable form capable of shrinking in the longitudinal direction upon the application of heat alone, a first reinforcing insert positioned within said first end region, a second reinforcing insert positioned within said second end region, said first and second inserts being provided with means to permit attachment one to the other.

7. The device of claim 6 wherein said end portions comprise heat recoverable members heat recovered around said inserts.

8. The device of claim 7 wherein said inserts are metallic.

9. The device of claim 7 wherein said first insert is generally flat and said second insert is L-shaped.

10. The device of claim 9 wherein said means with which said inserts are provided comprise apertures for receiving fastening means and wherein said end portions are provided with corresponding apertures.

References Cited

UNITED STATES PATENTS

| | | | |
|---|---|---|---|
| 2,427,883 | 9/1947 | Score et al. | 248—74 XR |
| 3,022,543 | 2/1962 | Baird et al. | 18—57 |
| 3,086,242 | 4/1963 | Cook et al. | 264—230 XR |
| 3,159,708 | 12/1964 | Deal. | |

DONALD A. GRIFFIN, Primary Examiner.

U.S. Cl. X.R.

248—74; 264—230